Oct. 3, 1950            O. B. VETTER            2,524,241
APPARATUS FOR MEASURING THE PRODUCT OF
TWO OR MORE VARIABLES

Filed July 26, 1947                                3 Sheets-Sheet 2

INVENTOR.
OTTO B. VETTER

BY Kegan and Kegan
ATTORNEYS

Oct. 3, 1950     O. B. VETTER     2,524,241
APPARATUS FOR MEASURING THE PRODUCT OF
TWO OR MORE VARIABLES

Filed July 26, 1947     3 Sheets-Sheet 3

*INVENTOR.*
OTTO B. VETTER

BY Kegan and Kegan
ATTORNEYS

Patented Oct. 3, 1950

2,524,241

UNITED STATES PATENT OFFICE 2,524,241

APPARATUS FOR MEASURING THE PRODUCT OF TWO OR MORE VARIABLES

Otto B. Vetter, Chicago, Ill., assignor to Hagan Corporation, Pittsburgh, Pa., a corporation of Pennsylvania Application July 26, 1947, Serial No. 763,814

12 Claims. (Cl. 73—205)

This invention relates generally to apparatus for measuring and exhibiting the product of two variables undergoing measurement.

In its broad aspect, my novel apparatus comprises mechanism which links together two indicating instruments and which automatically computes and exhibits the product of the two variables being measured thereby. Kinematically, this novel mechanism translates the movements of said two indicating instruments into a rotary and a radial displacement, respectively, relative to a fixed point. These rotary and radial displacements, when followed by a single member moving about the fixed point, reflect the product of the two variables undergoing measurement. It is this resultant displacement of the said member relative to said fixed point that serves as the input impulse actuating exhibiting means.

Many measurements in industrial and other fields can only be obtained by multiplying two or more variables together and therefore it is apparent that my novel apparatus has wide applicability. One useful application of my invention, by way of concrete example, is the measurement of total heat transferred by a moving body of fluid. To effect this measurement, the mass, rate of flow and the temperature gradient of the fluid within the boundaries of a thermal system constitute the two variables referred to above, while the resultant movement of the exhibiting means referred to above is directly proportional to the instantaneous ingress or egress of heat to or from said fluid, as the case may be. Advantageously, a constant corrective factor which takes into account the particular physical characteristics of the fluid being measured may be simultaneously superposed upon the exhibiting means through proper proportioning of the charts used in recording devices embodying my invention.

This accurate and fully automatic measurement of heat flow is in direct contrast to the laborious, time consuming methods employed heretofore. Specifically, heat flow has been determined by first evaluating the mass rate of flow of the fluid and the temperature differential of the fluid in question, and then multiplying these individual, instantaneous values times the thermodynamic constant of the fluid under measurement. At best, such measurements give only an instantaneous picture of heat transfer to or from the fluid in question, as for example the momentary rate at which heat is rejected from steam during condensation within a condenser. Normally, however, it is desirable to record continuously the rate of change of heat flow to or from the fluid in question, rather than merely obtain a momentary rate of heat flow, since the system under measurement may be continually fluctuating due to changes in load and other factors. Also, in the event that the system is cycling appreciably, momentary readings are apt to represent peak or depressed values of the variables affecting the flow of heat, rather than the average or mean values, the result being that the calculated heat flow does not reflect the actual heat transfer which is taking place.

Advantageously, the instant invention, through its ability to automatically and continuously exhibit the product of two variables under measurement, possesses none of these drawbacks. One preferred embodiment of the present invention, whereby measurements of heat flow are obtained, includes a flowmeter actuated by the pressure differential established by a fluid flowing through a primary element, and an indicating thermometer moving in accordance with the temperature gradient existing between two reference points in said fluid. A pivoted member is positioned by the flowmeter in accordance with the rate of flow of said fluid through the primary element and carries guide means the configuration of which approximates the arc of a circle. A link is constrained to move along said guide means and is drivably connected to exhibiting means, which means pivot about a point coincident with the center of said circle when the pivoted member is in null position. In effect, said link movable along the pivoted member constitutes a variable length crank which rotates about the pivot point of said member. The lever arm of said crank is in turn regulated by the indicating thermometer acting through an intermediate mechanism. Said mechanism comprises a shaft positioned by the indicating thermometer, and conversion linkage interconnecting said shaft and said link, whereby rotational movement of the shaft is translated into a substantially linear displacement which is imparted to said link. It is this rotary and radial motion of the link under the combined influence of the flowmeter and the indicating thermometer, as imparted to and exhibited by the exhibiting means, which is proportional to the product of the rate of flow and the temperature gradient.

A principal object of the instant invention, therefore, is to provide a measuring instrument which automatically computes, exhibits and records the product of two variables undergoing separate measurement.

Another object of the instant invention is to provide a measuring instrument particularly well suited to the exhibiting and recordation of both instantaneous and aggregate values of heat transfer occurring within the boundaries of a given system.

A further object is to provide a measuring device characterized by a high degree of accuracy, reliability, and ease of calibration and use.

So that my novel measuring device may be more fully ascertained, reference is had to the accompanying drawings, which illustrate one form of my invention embodying the foregoing and such other objects, advantages and capabilities as are disclosed as this description proceeds, or as are inherent to my invention. For clarity of exposition, the ensuing description is made explicit and the accompanying drawings are detailed; however, it is distinctly to be understood that said exposition is illustrative only, and that the present invention is not restricted to the particular details recited in the specification or shown in the drawing.

In the drawings:

Figure 4 is a schematic view showing the manner in which the embodiment shown in Figures 1 through 3 cooperate with the balance of a measuring system (to be described below) for measuring heat flow or the like.

Like reference characters refer to like parts in the drawings and in the description of the invention which follows.

Referring now more specifically to the drawings, my invention is shown in connection with the measurement of heat flow within a thermal system. Transfer of heat within a thermal system normally involves two fluids in thermal contact with each other; hence the heat rejected by the high temperature fluid is transferred to the low temperature fluid. Therefore, it is apparent that the heat exchange within a thermal system may be determined by measuring the heat imparted to one of the fluids as it traverses the system, or rejected by the other. Basically, heat flow may be expressed as a function of the mass rate of flow of a fluid traversing the system, the temperature gradient of the fluid across the boundaries of said system, and the specific heat of the fluid under measurement. For all practical purposes, the specific heat of a fluid remains constant over the temperature range normally encountered, particularly if the fluid under measurement is a liquid. Hence, the variables which must be determined to obtain a measurement of heat flow are the mass rate of flow and the temperature gradient through which the fluid falls or ascends.

In a preferred embodiment of my invention, a ring balance flowmeter responds in accordance with the mass rate of flow, while an indicating resistance-type thermometer responds in accordance with the temperature gradient. The flowmeter and indicating thermometer are in turn linked to mechanism which automatically multiplies the flow factor times the temperature factor. The novel manner in which this multiplication is accomplished is the subject of the present invention and will be apparent to those skilled in the art upon consideration of the detailed description which follows.

Figure 1:
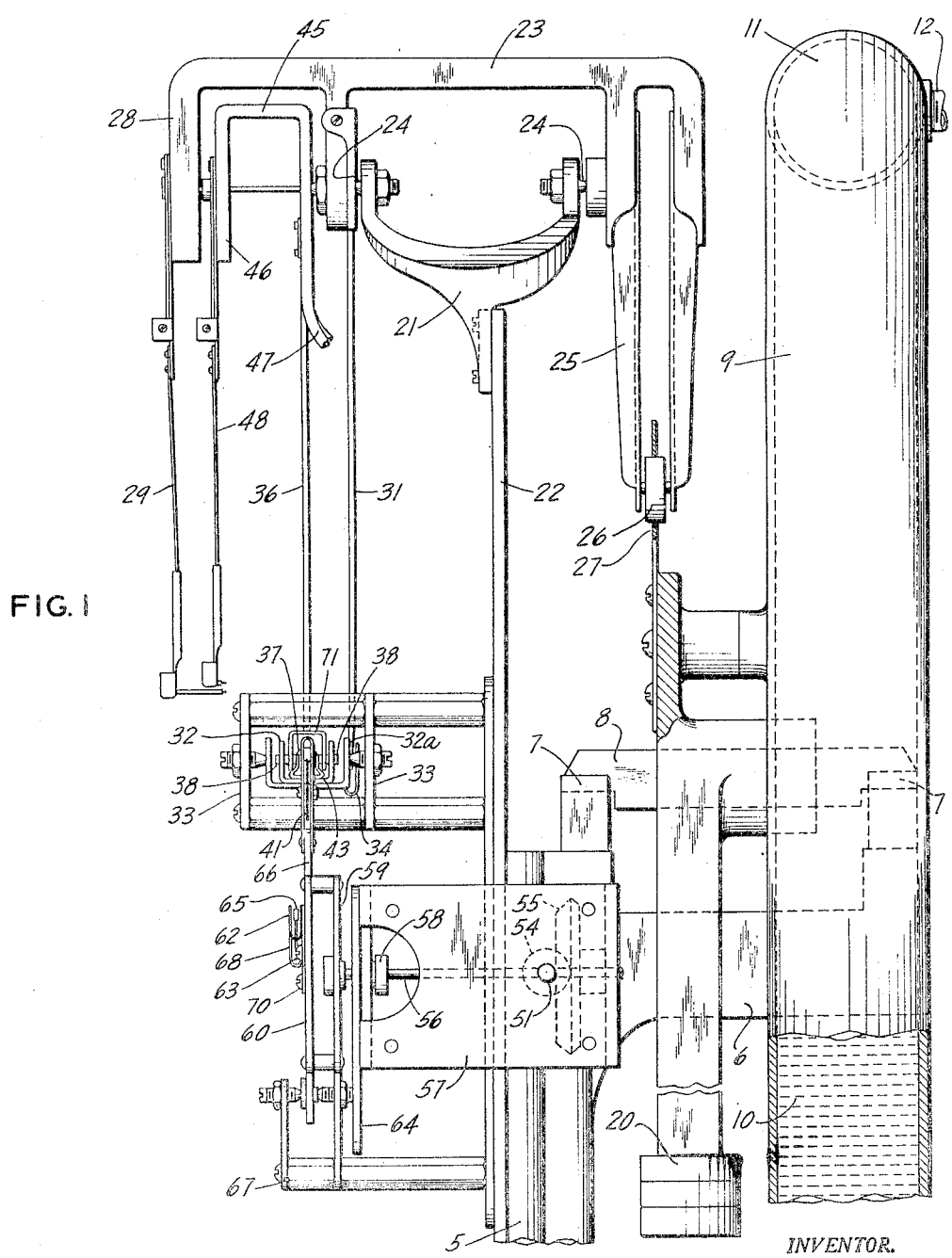
Figure 1 is a side elevational view, partly in section and with some parts broken away, of a measuring instrument embodying the present invention.

Referring now more particularly to Figure 1, the numeral 5 refers to a support having a pedestal 6 extending horizontally therefrom. The pedestal 6 is provided with a pair of V-shaped ways 7,7 spaced apart from each other and adapted to support and fulcrum the knife-edged journal bar 8 of the hollow torus 9. The interior of the hollow torus 9 is divided into two compartments by a body of liquid 10 and a partition 11.

Figure 4:
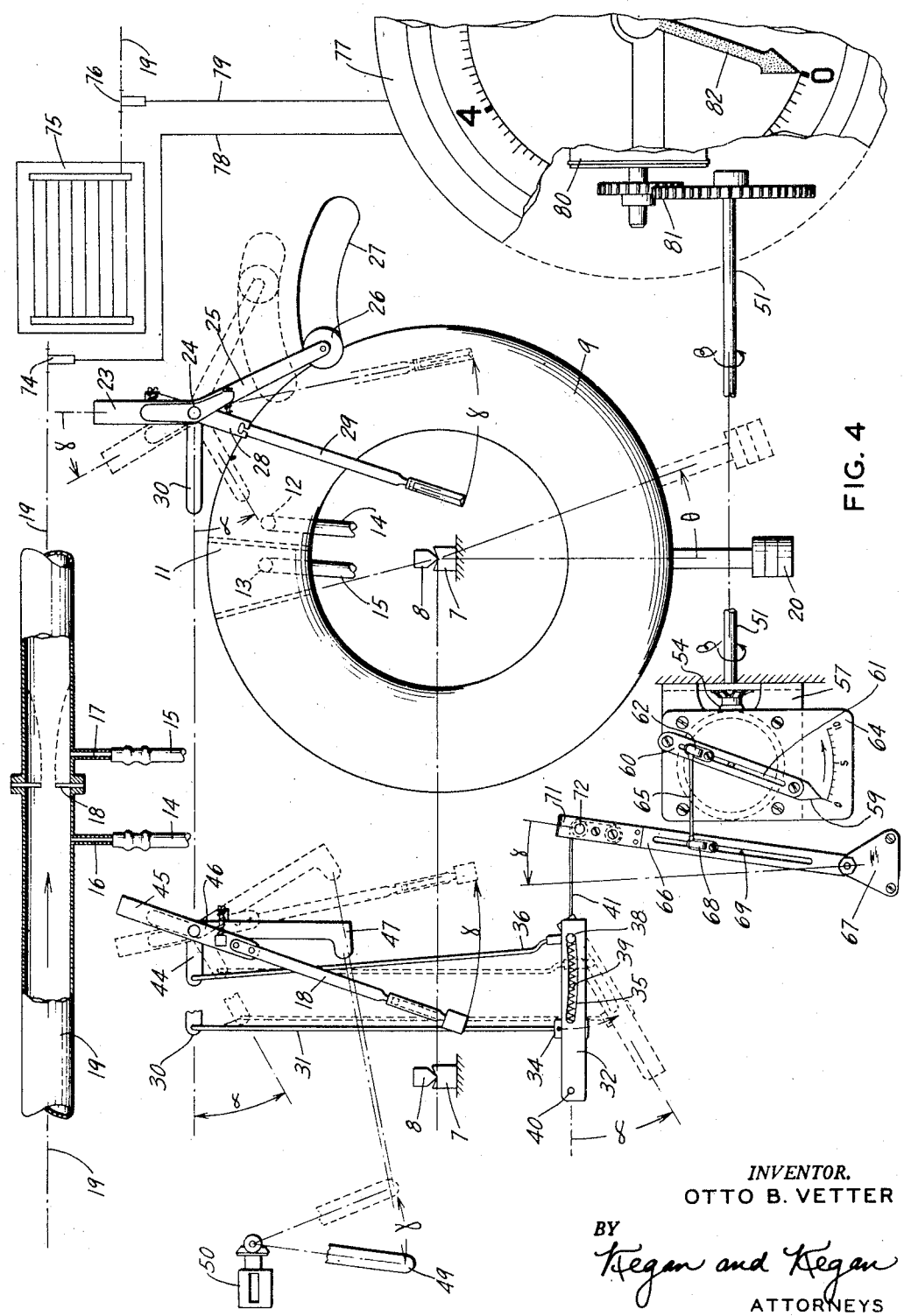

Referring now to both Figures 1 and 4, the two compartments delineated by the walls of the hollow torus 9, the liquid 10 and the partition 11 are pierced by two pressure inlets 12 and 13, respectively. In operation, inlets 12 and 13 are coupled to the pressure taps 16 and 17 through flexible couplings 14 and 15, respectively. The pressure taps 16 and 17 are positioned on different sides of the primary element 18 inserted into the conduit 19.

As fluid flows through the primary element 18, it creates a pressure differential across the element 18 which reflects back through the flexible couplings 14 and 15 to the two compartments of the hollow torus 9 and causes the torus 9 to rotate. As the torus 9 commences to rotate, however, displacement of the counterweight 20 from its dead center or null position creates a countertorque opposing further rotation. Equilibrium is obtained when the countertorque equalizes the driving torque created by the pressure differential across the primary element 18. Since the flow through the conduit 19 is proportional to the square root of the pressure differential across the element 18, the angular displacement $\theta$ of the torus 9 follows very closely a square root function with respect to the rate of fluid flow.

Figure 1 illustrates a stirrup-shaped bracket 21 which is fastened to the supporting plate 22 and which pivotably supports the main beam 23 at pivot points 24, 24. A follower link 25 is secured to one end of the main beam 23 and carries at its free end a cam follower 26. The cam follower 26 rides within and is actuated by the positive action cam 27 secured to the torus 9. A pen arm 28 is secured to the other end of the main beam 23 and actuates a first pen 29.

As the torus 9 rotates through an angle $\theta$, the cam 27, being secured to the torus 9, also rotates through an angle $\theta$. The deflection of the cam 27 actuates the cam follower 26, which motion is translated through the follower link 25 and the main beam 23 to the pen arm 28. Advantageously, the cam 27 extracts the square root, so that the displacement $a$ of the follower 26 is directly proportional to the flow of fluid through the conduit 19. Hence, the pen arm 28 and the first pen 29 also deflect through an angle $a$. Also fixed to the main beam 23 and rotating about the pivot points 24, 24, is a take-off lever 30. A drive link 31 is pivotably connected to the outer end of the take-off link 30.

Figure 2:
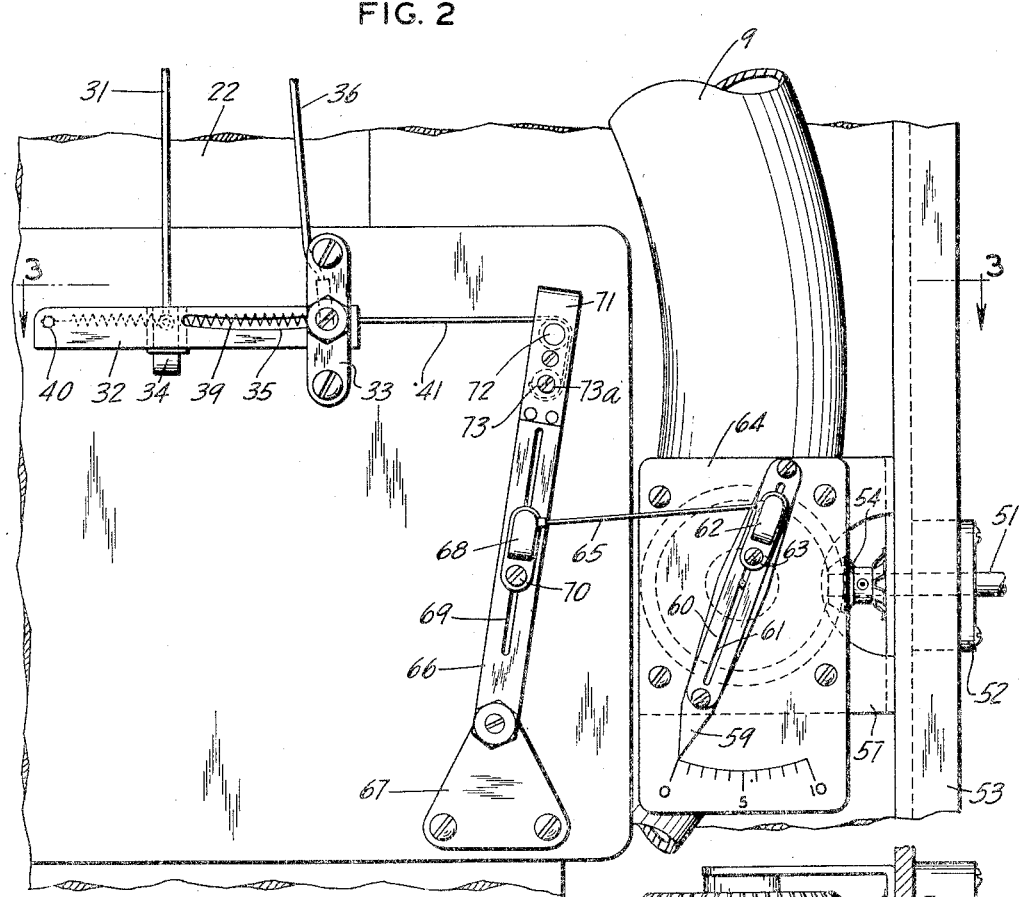
Figure 2 is a fragmentary front elevational view of the embodiment shown in Figure 1.
Figure 3:
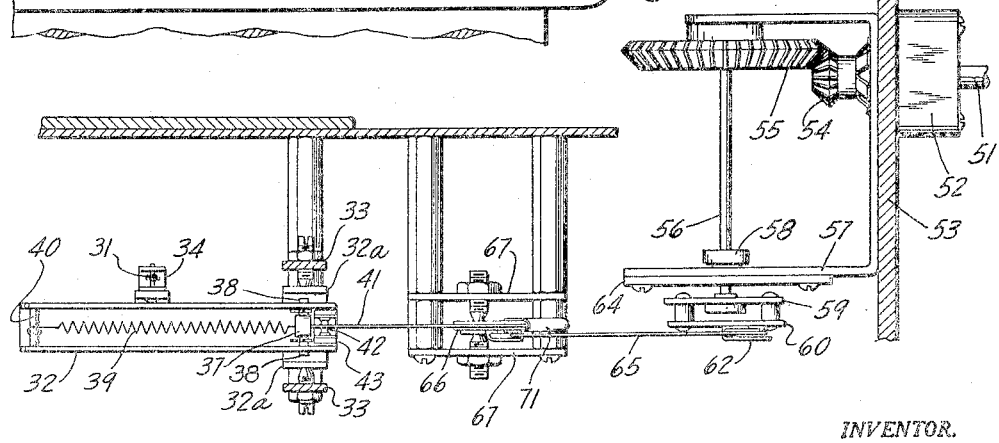
Figure 3 is a fragmentary plan view taken in section along the line 3—3 of Figure 2.

Referring now to Figures 2 and 3, the housing 32 is secured to a mounting strap 32a which in turn is pivotably mounted between the mounting plates 33, 33 secured to the supporting plate 22. The housing 32 is linked to the drive link 31 through the pivot assembly 34. When the distance between the pivot point of the housing 32 and the pivot assembly 34 is equal to the radius arm of the take-off lever 30, the housing 32 follows the same motion as does the first crank 30. This 1:1 ratio is preferable, since the deflection of the housing 32 is then directly proportional to the rate of flow through the conduit 19. The housing 32 contains an arcuate slot 35, one end of which terminates at the pivot point of said housing. For reasons hereinafter explained, the radius of curvature of the arcuate slot 35 is made equal to the effective length of the driven link 36. A crosshead 37 is guided along the arcuate slot 35 by two crosshead arms 38, 38 which extend into said slot. The driven link 36 extends upwardly from the crosshead 37. One end of the spring 39 is anchored to the housing 32 by means of the pin 40, while the other end of the spring 39 is secured to one side of the crosshead 37. The spring 39 is normally under tension and therefore urges the crosshead 37 away from the pivot point of the housing 32. A cable 41 is attached to the other side of the crosshead 37 and rides over the roller 42. The roller 42 is supported and positioned by the roller bracket 43 so that the cable 41 acts through the axis of rotation of the housing 32. Hence, the movement of the crosshead 37 along the slot 35 is a function of the linear movement of the cable 41. Thus, in effect, the crosshead 37 is a variable-radius link moving in conformity with the linear displacement of the cable 41. Cable 41 moves in accordance with variations in the temperature differential across the thermal system, the means for imparting this motion to the cable 41 being discussed more fully below.

As is illustrated in Figures 1 and 4, the driven link 36 is pivotably connected to the outer end of the crank 44. The crank 44 rotates about an axis coincident with that of the pivot points 24, 24 and is secured to the yoke 45. The yoke 45 in turn carries a pen arm 46 and an integrator take-off link 47. A second pen 48 is secured to the pen arm 46, while the integrator take-off link 47 is drivably linked to the integrator input arm 49 Movement of the input arm 49 drives an integrating mechanism preferably of the type shown in Patent No. 2,376,108, issued to Maurice J. Zucrow on May 15, 1945, and entitled Integrator. Such integrating mechanism in turn actuates the integrator register 50. Advantageously, the crank 44 (and hence also the pen arm 46 and integrator take-off link 47) is in null position when the housing 32 is in the undeflected position shown in Figure 2.

While conventional indicating thermometers exhibit a rotary motion, it has been found advantageous in the present invention to translate such rotary motion into a more or less linear motion and impart such motion to the cable 41. The novel structure by which this conversion is conveniently carried out is best shown in Figures 2 and 3. The drive shaft 51, supported by the collar 52 which is secured to the meter housing 53, is rotated by the indicating thermometer in accordance with variations in temperature differential. Mounted on the one end of the drive shaft 51 and driven thereby is a bevel gear 54. The bevel gear 54 in turn meshes with and drives the bevel gear 55. The bevel gear 55 is supported by the indicator shaft 56 which is journaled by the bracket 57 and which lies at right angles to the drive shaft 51. Proper axial alignment of the bevel gear 55 is maintained through the conjoint spacing action of the thrust bearing 58 and the hub portion of the bevel gear 55. The indicator shaft 56 extends through the bracket 57 and is coupled to the inner crank member 59 and the outer crank member 60. Extending along the length of the outer crank member 60 is a slot 61 which acts as a guide for the crank pivot assembly 62. To adjust the pivot assembly 62 relative to the outer crank member 60, it is only necessary to back off the clamp screw 63, move the assembly 62 along the slot 61 to the desired position, and then reset the clamp screw 63.

Advantageously, the position of the inner crank member 59 relative to the bracket 57 is indicative of the relative movement of the drive shaft 51. Since the movement of the drive shaft 51 reflects variances in the temperature differential undergoing measurement, it follows that the inner crank member 59 also reflects such variances. Hence, I find it advantageous to attach to the bracket 57 a dial face 64 having a graduated scale thereon which reads directly in the temperature units desired.

As the outer crank member 60 moves in accordance with the temperature differential, this motion is translated to the connecting rod 65, said rod 65 being pivotally connected to the member 60 at the crank pivot assembly 62. A movement of the connecting rod 65 in turn actuates the lever 66, said lever being pivotally mounted between the mounting plates 67, 67. The juncture point between the rod 65 and the lever 66 consists of a lever pivot assembly 68 which is positionable within the slot 69. The lever pivot assembly 68, like its counterpart 62, is detachably clamped to the lever 66 by means of a clamp screw 70. An inverted U-shaped strap 71 is secured to the free end of the lever 66. Intermediate the legs of the strap 71, and supported thereby, are a cable guide pin 72 and an anchoring pin 73. The cable 41, one end of which is secured to the crosshead 37, passes over the cable guide pin 72 and is anchored at its other end to the anchoring pin 73.

Advantageously, the anchoring pin 73 may be rotated relative to the U-shaped strap 71 by means of the slotted head 73a, thereby either shortening or lengthening the effective length of the attached cable 41 as the anchoring pin 73 is turned. Also, the motion imparted to the lever 66 by the connecting rod 65 may be varied appreciably both as to magnitude and function by moving the pivot assemblies 62 and 68 along the slots 61 and 69 respectively. By using these foregoing corrective adjustments, either individually or collectively, the linear movement of the cable 41 may be made to follow within extremely close limits the rotary motion imparted to the drive shaft 51.

Fundamentally, a temperature gradient which exists across the boundaries of a thermal system is obtained by subtracting the low temperature at the one boundary of the system from the high temperature at the other boundaries of the system. In actual practice, this computation may be accurately and automatically performed by using a modified resistance-type thermometer circuit. Specifically, this modification consists in placing two resistance bulbs at the two boundary points, respectively, and coupling said bulbs into the circuit in reverse polarity with respect to each other. The resultant, equivalent resistance, therefore, is a measure of the temperature differential across the two boundary points.

To this end, I place a resistance element 74 in thermal contact with the fluid entering one side of the heat exchanger 75. A second resistance element 76 is placed in thermal contact with fluid leaving the heat exchanger 75. For purposes of this discussion the entire heat exchanger 75 is considered as a thermal system wherein the resistance elements 74 and 76 comprise boundary points of the system, while the fluid flowing through the conduit 19 also flows through the heat exchanger 75 and in so doing either loses or gains heat.

While several types of resistance-type thermometer circuits may be used for indicating a temperature differential across the heat exchanger 75, I have found a null or balance slidewire potentiometer, indicated by the numeral 77, to be particularly advantageous. Such instruments, besides having a high degree of accuracy, are, among other things, particularly well adapted to control the flow of fluid through the conduit 19 for the purpose of holding the temperature differential within predetermined limits.

The potentiometer 77 is electrically coupled to the resistance elements 74 and 76 by means of leads 78 and 79, respectively. As the temperature differential across the heat exchanger 75 varies, the equivalent resistance of the resistance elements 74 and 76 varies proportionately. This variation in resistance unbalances the bridge circuit of the potentiometer 77. Since the potentiometer 77 is of a balanced slide-wire type, the slide wire drum 80 moves to correct this unbalance, and in so doing deflects directly proportional to the variation in the temperature differential. The motion of the slide wire drum 80 is in turn imparted to the drive shaft 51 through a suitable gear train 81. Simultaneously, the pointer 82 indicates the instantaneous temperature values, while recording means (not shown) plot these values on a suitable chart (not shown) which reads in the particular temperature units desired.

As the drive shaft 51 rotates in accordance with the temperature differential, this angular displacement $\beta$ is translated through the bevel gears 54 and 55 to the inner and outer crank members 59 and 60. Because of the direct gear coupling employed, the inner crank member 59 deflects in accordance with the temperature gradient across the heat exchanger 75. As shown above, an instantaneous reading of the temperature gradient is obtained by noting the position of the inner crank member 59 along the scale portion of the dial face 64. The motion imparted to the outer crank member 60 is in turn translated into a linear movement, which motion is derived and imparted to the cable 41 through the lever 66. Therefore, the linear travel of the crosshead 37 within the arcuate slot 35 of the housing 32 is also proportional to said temperature gradient. As the temperature gradient increases, the movement of the various interconnected components between the slide wire drum 80 and the cable 41 deflect in the directions indicated in dotted outline in Figure 4.

As shown above, the mass rate of flow of the fluid flowing through the heat exchanger 75 is obtained by measuring the pressure differential created by the primary element 18. This pressure differential actuates the torus 9 and, through the combined action of the cam 27 and cam follower 23, the main beam 23 is driven through an angle $\alpha$ which is proportional to the rate of flow through the conduit 19. Since the radius arm of the bell crank 44 is equal to the radius arm of the housing 32, said housing 32 also deflects through an angle $\alpha$. Hence, the crosshead 37 also rotates through the angle $\alpha$ as long as it is a finite distance from the pivot point of the housing 32. As the flow through the conduit 19 increases over a zero flow, the linkage between the torus 9 and the housing 32 deflects in the directions indicated in dotted outline in Figure 4.

When the flow of fluid and the temperature differential across the heat exchanger 75 are both zero, the relative positions of the various components are as shown in full line in Figure 4. Specifically, the center of curvature of the slot 35 coincides with the upper pivot point of the driven link 36, while the center line of the crosshead guide arms 38, 38 coincides with the pivot point of the housing 32. So long as the housing 32 remains in the foregoing position, movement of the crosshead 37 along the slot 35 will not actuate the crank 44, since the radius of curvature of the arcuate slot 35 is equal to the radius arm of the take-off lever 30. Hence, in the absence of a flow of fluid through the primary element 18, the pen 48 registers a zero heat flow regardless of the magnitude of the temperature differential which exists across the heat exchanger 75. Conversely, so long as the temperature differential across the heat exchanger 75 is equal to zero, the crank 44 again will not deflect, even though fluid is flowing through the heat exchanger 75, since under this set of conditions the lever arm of the crosshead 37 is zero.

On the other hand, when both the rate of flow and the temperature differential are varying about some positive level, the crosshead 37 undergoes both rotational and radial movement about the pivot point of the housing 32. This resultant movement is directly proportional to variations in the true heat flow to or from the fluid within the heat exchanger 75. Said motion is in turn imparted to the crank 44 through the driven link 36. Since the pen arm 46, and hence the second pen arm 46, is linked directly to the crank 44, it also deflects proportionate to the heat flow. This angular deflection, designated $\gamma$ in Figure 4, is proportional to the product of the angular deflections $\alpha$ and $\beta$. In addition, the integrator take-off link 47 rotates through an angle $\gamma$; hence the integrator input arm 49 also deflects through an angle $\gamma$.

As the first pen 29 and the second pen 46 move in accordance with the fluid flow and the heat flow respectively, their deflections from the null position are plotted on a suitable chart (not shown). The chart is preferably calibrated to correct for the effect of the specific heat constant as the heat flow is plotted, thereby giving a direct reading in convenient thermal units. Along with the recordation of the temperature differential at the potentiometer 77, then, a complete recordation of the instantaneous values of fluid flow, temperature differential, and heat flow is obtained. A logical and useful extension of these measurements consists of integrating the instantaneous values of heat flow by means of an integrator mechanism such as that designated hereinabove, the aggregate heat flow being exhibited on the integrator register 50.

While no special heat flow measurement has been set forth above, several may be mentioned as exemplary. One important application of the present invention consists in measuring the heat rejected from steam as it condenses within a surface condenser. Since the steam rejects heat at a constant temperature during at least a part of the condensation process, it is necessary to meter the coolant, which undergoes no change in state. Another useful application of the present invention involves the measurement of heat rejected by a brine solution during its passage through the evaporator of a refrigeration system. In this case the brine is metered, rather than the refrigerant, since it undergoes no change in state. Where neither of the fluids undergoes a change of state within the heat exchange element, the fluid which is metered should, if possible, be that fluid which undergoes the greater change in temperature, which is least corrosive to the measuring elements, which is most accessible for metering purposes, and whose flow is least affected by the insertion of orifice plates or other primary elements therein.

It is apparent that when heat flow is being measured by means of my invention that any indicating thermometer may be substituted for the resistance-type thermometer 77 shown and described. For example, an indicating thermoelectric-type thermometer may be readily substituted for the resistance-type thermometer 77. Similarly, any flow responsive element which has a resultant deflection proportional to the rate of flow may be substituted for the torus 9 and its dependent mechanism linked to the housing 32. Obviously, the variables which may be combined through operation of my invention are not limited to those enumerated in the foregoing exposition.

While I have shown and described a specific embodiment of my invention as adapted to the exhibiting and recordation of heat flow, it is to be understood that this embodiment has been given by way of example only and that various changes and rearrangements of the details shown herein both as to structure and use may be made without departing from the spirit of the invention, the scope of which is defined in the appended claims.

I claim:

1. A device for exhibiting instantaneous magnitudes of a first variable superimposed on a second variable, comprising: a first pivot, a guide member turning thereon, means for positioning said guide member in accordance with the magnitude of said first variable, a rotatable member and pivot means thereon distant from said first pivot, said guide member being provided with a guide seat having a radius of curvature equal to the distance between said first pivot and said pivot means, a crosshead movable along said guide slot having a radius of curvature equal to head and said pivot means, indicating linkage operatively connected to said rotatable member, a cable connected at one end thereof to said crosshead, spring means resisting deflection of said crosshead; a third pivot, a first crank turning thereon, said first crank being connected to the other end of said cable, guide means causing said cable to act through the axis of said first pivot, a member on said first crank adjustably movable along an axis intersecting said third pivot, a link pivotably connected at one end thereof to said member; a shaft, means for positioning said shaft in accordance with the magnitude of said second variable, gear means coupled to said shaft, a second crank drivably connected to said gear means, and a member on said second crank adjustably movable along the lever arm thereof, said last-mentioned member being pivotably connected to the other end of said link.

2. A measuring device or the like comprising a shaft, means for positioning said shaft in accordance with the magnitude of a first variable, a crank, gear means drivably connecting said shaft to said crank; a first pivot, and a guide member mounted thereon, means for positioning said guide member in accordance with the magnitude of a second variable, a rotatable member including a second pivot distant from said first pivot, guide means associated with said guide member having a radius of curvature equal to the distance between said first pivot and said second pivot, a second member movable along said guide means, a cable connected at one end thereof to said guide member, and linkage operatively connecting the other end of said cable to said crank.

3. Mechanism for exhibiting instantaneous magnitudes of a first variable superimposed on a second variable, comprising a shaft, means for positioning said shaft in accordance with the magnitude of said first variable, a first crank drivably connected to said shaft, a first pivot, a second crank, said second crank mounted on said first pivot, a first link drivably connecting said first crank and said second crank; a second pivot and a guide member turning thereon, means for positioning said guide member in accordance with the magnitude of said second variable, an arm and pivot means thereon, said pivot means being distant from said second pivot, said guide means being provided with a guide slot having a radius of curvature equal to the distance between said second pivot and said pivot means, a second link constrained at one end thereof to move along said arcuate guide slot, the other end of said second link being coupled to said pivot means on said arm, exhibiting means positioned by said arm, and a cable connecting said second crank and said one end of said second link, said cable acting through the axis of said second pivot, whereby said exhibiting means reflect the product of said first variable and said second variable.

4. Mechanism for exhibiting instantaneous magnitudes of a first variable superimposed on a second variable, comprising: a first rotatable member, means for positioning said member in accordance with the magnitude of said first variable, a second rotatable member, means for positioning said second rotatable member in accordance with the magnitude of said second variable, a crosshead carried by said second rotatable member and movable thereon, means constraining said crosshead to follow along an arcuate path on said second member the line of action of which intersects the axis of rotation of said second member, a flexible member drivably connecting said first member to said crosshead, said flexible member acting through said axis of rotation of said second member, exhibiting means, and a drive link the length of which corresponds to the radius of curvature of said arcuate path, one end of said drive link being drivably connected to said crosshead, and the other end of said drive link being pivotably connected to said exhibiting means.

5. Mechanism for exhibiting instantaneous magnitudes of a first variable superimposed on a second variable, comprising: a rotatable first member, means for positioning said member in accordance with the magnitude of said first variable, a second member, pivot means on said second member distant from the axis of rotation of said rotatable member, guide means associated with said rotatable member and having an arcuate configuration the radius of curvature of which is approximately equal to the distance between said pivot means and said axis of rotation, a guided member positionable along said guide means, means positioning said guided member along said guide means and relative to said axis of rotation in accordance with the magnitude of said second variable, and drive means connecting said guided member and said pivot means on said rotatable member.

6. A motion transformer comprising: a first pivot and a guide member pivoted thereon, means for angularly positioning said guide member, a rotatable member, pivot means on said rotatable member distant from said first pivot, said guide member being provided with a guide slot having a radius of curvature equal to the distance between said first pivot and said pivot means, a member movable along said guide slot, a link connecting said member and said pivot means on said rotatable member, spring means urging said member along said guide slot away from said first pivot, a cable connected at one end thereof to said member, guide means causing said cable to act through the axis of said first pivot, and means for positioning said cable.

7. In a measuring instrument, a motion transformer comprising: a first pivot and a guide member pivoted thereon, means for positioning said guide member, a rotatable member, pivot means on said rotatable member distant from said first pivot, guide means associated with said guide member and having an arcuate configuration the radius of curvature of which is approximately equal to the distance between said first pivot and said pivot means, a guided member positionable along said guide means, a connecting rod between said guided member and said pivot means on said rotatable member, a cable connected to said guided member, and means acting on said guided member to keep said cable taut.

8. In a measuring instrument, a motion converter comprising: a first pivot and a guide member turnable thereon, means for positioning said guide member, a second member, pivot means on said second member distant from said first pivot, a link connected at one end thereof to said pivot means, the other end of said link operatively connected to said guide member and movable thereon, means constraining said other end to move along an arcuate path on said guide member the radius of curvature of which is equal to the effective length of said link, a flexible member connected to said other end of said link, and means acting on said other end of said link to keep said flexible member taut.

9. In a measuring instrument, motion converting mechanism comprising: a first rotatable member, pivot means carried by said member, a second rotatable member, guide means associated with said second member and having an arcuate configuration the radius of curvature of which equals the distance between said pivot means and the axis of rotation of said second member, a link one end of which is constrained to displace along said guide means, the other end of said link connected to said pivot means, a driven member, and a flexible member drivably connecting said one end of said link to said driven member.

10. In a measuring instrument including a hollow torus mounted on a support, liquid and a partition dividing the interior of said hollow torus into two compartments, said two compartments being connected to two sources of fluid pressure, respectively, a cam carried by said hollow torus, a cam follower carried by said support, and linkage depending from said cam follower exhibiting a function of the pressure differential between said two sources of pressure, mechanism for exhibiting the product of said function and the function of another variable under measurement, said mechanism comprising: a pivot carried by said support, a guide member mounted thereon, said guide member being coupled to and positioned by said linkage, a second pivot carried by said support and distant from said first pivot, an arm rotatable about said second pivot, pivot means carried by said arm eccentric of said second pivot, said guide member provided with a guide slot having a radius of curvature equal to the distance between said first pivot and said pivot means, a follower one end of which is guided by said slot, the other end of said follower being coupled to said pivot means, indicating means drivably connected to said arm, a cable connected at one end thereof to said follower; a shaft, means turning said shaft in accordance with variances in said other variable, gear means coupled to said shaft, a crank drivably connected to said shaft through said gear means; a third pivot, a first link turning thereon and linked to the other end of said cable, said cable acting through the axis of rotation of said first pivot, and a second link drivably connecting said first link with said crank.

11. In a measuring instrument including a hollow torus, liquid and a partition dividing the interior of said hollow torus into two compartments, said compartments being connected to two sources of fluid pressure, respectively, and linkage drivably connected to said torus and adapted to exhibit a function of the pressure differential between said two sources of pressure, mechanism for exhibiting the product of said function and the function of another variable under measurement, said mechanism comprising: exhibiting means including a pivoted arm, pivot means on said arm, a rotatable member positioned by said linkage, guide means on said rotatable member having an arcuate configuration the radius of curvature of which is approximately equal to the distance between the axis of rotation of said first member of said pivot means on said arm when said instrument is in the null position, a follower positionable along said guide means, a link connecting said follower and said pivot means on said arm, a driven member, means positioning said driven member in accordance with variances in said other variable, flexible means for transmitting the position of said driven member to said follower, means causing said flexible means to act through the center of rotation of said first member, and spring means resisting displacement of said follower toward the axis of rotation of said first member.

12. In measuring apparatus including exhibiting means, an input lever actuating said exhibiting means, a first rotatable member positioned in accordance with the magnitude of a first variable, and a second member positioned in accordance with the magnitude of a second variable, means for causing said exhibiting means to exhibit the product of said first and second variables, said means comprising: guide means carried by said first rotatable member and having a substantially arcuate configuration the radius of curvature of which is substantially equal to the distance between the axis of rotation of said rotatable member and an eccentric point on said input lever when said lever is in the null position, a guided member positionable along said guide means, means connecting said second member and said guided member to vary the position of said guided member relative to said axis of rotation of said rotatable member in accordance with the magnitude of said second variable, and a link interconnecting said guided member and said input arm at said eccentric point.

OTTO B. VETTER.

REFERENCES CITED

The following references are of record in the file of this patent:

UNITED STATES PATENTS

| Number | Name | Date |
|---|---|---|
| 808,150 | Fristoe | Dec. 26, 1905 |
| 1,401,916 | Muench | Dec. 27, 1921 |
| 1,894,449 | Sandvoss | Jan. 17, 1933 |
| 1,972,660 | Maier | Sept. 4, 1934 |
| 2,197,730 | Mugford | Apr. 16, 1940 |
| 2,216,687 | Harrison | Oct. 1, 1940 |
| 2,229,156 | Wertheimer | Jan. 21, 1941 |
| 2,376,108 | Zucrow | May 15, 1945 |
| 2,379,874 | Bean | July 10, 1945 |

Certificate of Correction

Patent No. 2,524,241     October 3, 1950

OTTO B. VETTER

It is hereby certified that error appears in the printed specification of the above numbered patent requiring correction as follows:

Column 9, line 57, for "seat" read *slot*; lines 60 and 61, strike out "having a radius of curvature equal to head" and insert instead the comma and words , *a connecting rod between said crosshead*;

and that the said Letters Patent should be read as corrected above, so that the same may conform to the record of the case in the Patent Office.

Signed and sealed this 5th day of December, A. D. 1950.

[SEAL]

THOMAS F. MURPHY,
*Assistant Commissioner of Patents.*